US008264567B2

(12) United States Patent
Sakaue et al.

(10) Patent No.: US 8,264,567 B2
(45) Date of Patent: Sep. 11, 2012

(54) ELECTRONIC APPARATUS, IMAGING DEVICE, METHOD FOR TIME CORRECTION, AND PROGRAM

(75) Inventors: Yohei Sakaue, Tokyo (JP); Shigekuni Chiba, Ibaraki (JP)

(73) Assignee: Sony Corporation (JP)

( * ) Notice: Subject to any disclaimer, the term of this patent is extended or adjusted under 35 U.S.C. 154(b) by 331 days.

(21) Appl. No.: 12/653,432

(22) Filed: Dec. 14, 2009

(65) Prior Publication Data

US 2010/0177202 A1 Jul. 15, 2010

(30) Foreign Application Priority Data

Dec. 25, 2008 (JP) ................................ P2008-330547

(51) Int. Cl.
*H04N 5/235* (2006.01)
*H04N 5/228* (2006.01)
*H04N 5/76* (2006.01)

(52) U.S. Cl. .................................. 348/222.1; 348/231.5

(58) Field of Classification Search ............... 348/222.1, 348/231.2, 231.3, 231.5, 231.6, 207.1; 701/468, 701/66
See application file for complete search history.

(56) References Cited

U.S. PATENT DOCUMENTS 4,777,590 A * 10/1988 Durkos et al. .................. 712/43
6,212,133 B1 * 4/2001 McCoy et al. .................... 368/9
7,224,395 B2 * 5/2007 Kato et al. .................... 348/341
2002/0012290 A1 * 1/2002 Shinagawa ....................... 368/21
2002/0167603 A1 * 11/2002 Kato et al. .................... 348/341
2006/0195260 A1 * 8/2006 Gronemeyer ................. 701/213
2008/0117309 A1 * 5/2008 Jeon ........................... 348/231.2
2009/0141142 A1 * 6/2009 Tsutsui ....................... 348/222.1
2009/0143073 A1 * 6/2009 Hovers et al. .............. 455/452.2

FOREIGN PATENT DOCUMENTS

JP 2001-356838 A 12/2001
JP 2002-216280 * 8/2002
JP 2002216280 A 8/2002

OTHER PUBLICATIONS

Office Action from Japanese Application No. 2008-330547, dated Nov. 30, 2010.

* cited by examiner

*Primary Examiner* — Nicholas Giles
(74) *Attorney, Agent, or Firm* — Lerner, David, Littenberg, Krumholz & Mentlik, LLP

(57) ABSTRACT

An electronic apparatus includes a time measuring unit that measures time, a time information acquiring unit that acquires time information, a determining unit that determines whether a specific process using time measured by the time measuring unit is being performed, and a time correcting unit that corrects time measured by the time measuring unit on the basis of the time information when the determining unit determines that the specific process is not being performed.

12 Claims, 9 Drawing Sheets

ELECTRONIC APPARATUS, IMAGING DEVICE, METHOD FOR TIME CORRECTION, AND PROGRAM

CROSS-REFERENCE TO RELATED APPLICATION

The present application claims priority from Japanese Patent Application No. JP 2008-330547 filed in the Japanese Patent Office on Dec. 25, 2008, the entire content of which is incorporated herein by reference.

BACKGROUND OF THE INVENTION

1. Field of the Invention

The present invention relates to electronic apparatuses, and in particular, relates to an electronic apparatus and imaging device that correct time, a method for time correction, and a program that allows a computer to perform the method.

2. Description of the Related Art

There have been imaging devices, such as digital video cameras, having a time measuring function of measuring time. Time measured in this way is used, for example, when time is displayed on a display unit of the imaging device. Alternatively, when the imaging device is recording a moving picture, the measured time is used as time associated as meta information with each frame constituting the moving picture. It is convenient because a user can easily know recording time of the moving picture upon playback of the moving picture recorded as described above.

In some cases, however, an error occurs between time measured in the imaging device and actual time. Hence, there have been proposed clock devices for, for example, externally acquiring time information to correct time. For example, Japanese Unexamined Patent Application Publication No. 2001-356838 (FIG. 1) discloses a clock device that calculates time on the basis of, for example, GSP signals received from GPS satellites to correct time on the basis of the calculated time.

SUMMARY OF THE INVENTION

According to the above-described related art, for example, even when time measured in the imaging device has an error, time correction can be appropriately performed.

For instance, however, when time correction is performed during recording of a moving picture while time is associated with each frame, time recorded before and after the correction may be remarkably changed. Disadvantageously, when the moving picture recorded as described above is played, it is difficult for the user to grasp recording time of the moving picture.

The present invention has been made in consideration of the above-described disadvantages. It is desirable to perform time correction at appropriate time.

The present invention has been made in order to overcome the above-described disadvantages. According to an embodiment of the present invention, an electronic apparatus includes a time measuring unit that measures time, a time information acquiring unit that acquires time information, a determining unit that determines whether a specific process using time measured by the time measuring unit is being performed, and a time correcting unit that corrects time measured by the time measuring unit on the basis of the time information when the determining unit determines that the specific process is not being performed. This provides an advantage in that if time information is acquired and a specific process using time measured by the time measuring unit is not being performed, time measured by the time measuring unit is corrected on the basis of the time information.

In the embodiment of the present invention, the determining unit may determine whether a process of acquiring the time information by the time information acquiring unit is being performed as the specific process. This provides an advantage in that time is not corrected while the process of acquiring the time information is being performed by the time information acquiring unit.

In the embodiment of the present invention, the electronic apparatus may further include an accepting unit that accepts an instruction to turn on or off the power of the electronic apparatus. After the instruction is accepted, the determining unit may determine whether the specific process is being performed. This provides an advantage in that whether the specific process is being performed is determined after the instruction to turn off the power of the electronic apparatus is accepted.

In the embodiment of the present invention, the electronic apparatus may further include an instructing unit that gives an instruction to turn off the power of the electronic apparatus when a process based on a user operation is not performed for a predetermined period of time. After the instruction is accepted, the determining unit may determine whether the specific process is being performed. This provides an advantage in that when a process based on a user operation is not performed for a predetermined period of time, an instruction to turn off the power of the electronic apparatus is given, and after the instruction is accepted, whether the specific process is being performed is determined.

In the embodiment of the present invention, the electronic apparatus may further include a display unit that, after the time correcting unit corrects the time, displays information indicating the correction. This provides an advantage in that after time is corrected, information indicating the correction is displayed on the display unit.

In the embodiment of the present invention, the time information acquiring unit may acquire the time information at regular intervals and the time correcting unit may correct time measured by the time measuring unit on the basis of the acquired time information and a difference value corresponding to time elapsed from the time when the time information is acquired. This provides an advantage in that time measured by the time measuring unit is corrected on the basis of acquired time information and a difference value corresponding to elapsed time.

According to another embodiment of the present invention, an imaging device includes an imaging unit that captures an image of a subject to generate image data, a time measuring unit that measures time, a recording control unit that records the generated image data in association with time measured by the time measuring unit, a time information acquiring unit that acquires time information, a determining unit that determines whether the image data is being recorded by the recording control unit, and a time correcting unit that corrects time measured by the time measuring unit on the basis of the time information when the determining unit determines that the image data is not being recorded. This provides an advantage in that time measured by the time measuring unit is corrected on the basis of time information when image data is not being recorded.

According to another embodiment of the present invention, there is provided a method for time correction, including the steps of acquiring time information, determining whether a specific process using time measured by a time measuring unit is being performed, and correcting time measured by the time measuring unit on the basis of the time information when it is determined that the specific process is not being performed.

According to another embodiment of the present invention, there is provided a program that allows a computer to perform the following steps of acquiring time information, determining whether a specific process using time measured by a time measuring unit is being performed, and correcting time measured by the time measuring unit on the basis of the time information when it is determined that the specific process is not being performed.

The embodiments of the present invention have excellent advantages in that time is corrected at appropriate time.

DESCRIPTION OF THE PREFERRED EMBODIMENTS

The best mode (hereinafter, referred to as an "embodiment") for embodying the present invention will be described below. The description will be performed in the following order:

1. First Embodiment (Time Correction Control: Example of Time Correction Using Time Information Based on GPS Signal); and
2. Modification (Example of Acquiring Time Information from Access Point).

1. First Embodiment

Exemplary Internal Configuration of Imaging Device

Figure 1:
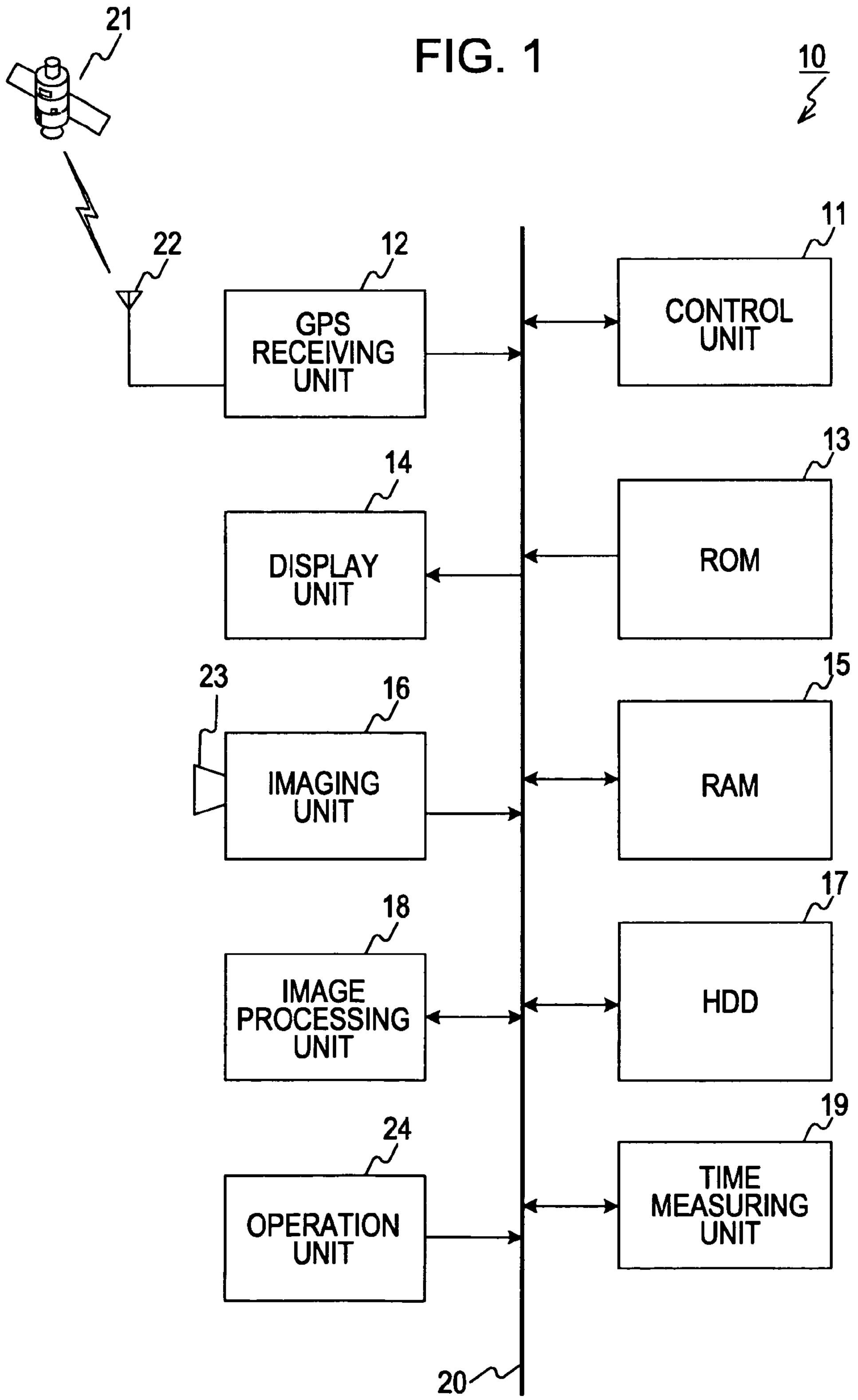
FIG. 1 is a block diagram illustrating an exemplary configuration of an imaging device according to a first embodiment of the present invention.

FIG. 1 is a block diagram illustrating an exemplary configuration of an imaging device 10 according to a first embodiment of the present invention. The imaging device 10 includes a control unit 11, a GPS receiving unit 12, a display unit 14, an imaging unit 16, an image processing unit 18, a time measuring unit 19, an operation unit 24, and a bus 20. The imaging device 10 further includes a read only memory (ROM) 13, a random access memory (RAM) 15, and a hard disc drive (HDD) 17. Data transmission and reception between the components constituting the imaging device 10 are performed through the bus 20.

The ROM 13 includes a read only memory unit, stores parameters necessary for operations of the control unit 11, and outputs the parameters to the control unit 11.

The GPS receiving unit 12 includes an antenna 22 to acquire time information on the basis of time data (indicating coordinated universal time (UTC)) included in a GPS signal transmitted from a GPS satellite 21. The GPS receiving unit outputs the acquired time information to the RAM 15 to temporarily store the time information in the RAM 15. The time information indicates, for example, hour, minute, and second. To reduce the power consumption of the imaging device 10, the GPS receiving unit 12 receives a GPS signal at time intervals of, for example, 20 seconds.

The RAM 15 includes a rewritable memory unit. When the control unit 11 performs a process, the RAM 15 temporarily stores data which is being processed. The RAM 15 also stores time information output from the GPS receiving unit 12. In addition, a value corresponding to time elapsed from the time when time information is acquired by the GPS receiving unit 12 is output from the control unit 11, for example, every millisecond (1 ms) and is then stored into the RAM 15.

The control unit 11 includes a central processing unit (CPU) or the like and controls the entire operation of the imaging device 10. In addition, the control unit 11 starts counting when the GPS receiving unit 12 outputs time information to the RAM 15. The control unit 11 outputs a counter value to the RAM 15 every, for example, 1 ms to store a cumulative counter value in the RAM 15.

The imaging unit 16 performs conversion on incoming light from a subject converged through a unit lens 23 to generate image data (captured moving picture) and outputs the generated image data to the image processing unit 18.

The HDD 17 stores various application programs. For example, the HDD 17 stores image data output from the image processing unit 18 as a moving picture file.

The image processing unit 18 performs various image processes on image data output from the imaging unit 16 and outputs the resultant image data to the HDD 17.

The time measuring unit 19 includes a real time clock (RTC) or the like, the RTC operating while being supplied with power from an internal battery even during power-off, and measures time. During power-on, the time measuring unit 19 operates while being supplied with power from an external power supply. Upon startup, the control unit acquires time measured by the time measuring unit 19 and performs various controls using the time. Specifically, the control unit 11 manages time acquired from the time measuring unit 19 as a system clock. The time is used as time associated as meta information with each frame constituting, for example, a moving picture file recorded on the HDD 17. In the description of the first embodiment of the present invention, a process performed using time managed by the control unit 11 or time measured by the time measuring unit 19 will be called a specific process.

The display unit 14 includes a small liquid crystal display or the like and displays various pieces of information on a screen. When time measured by the time measuring unit 19 is corrected, the display unit 14 displays information indicating the time correction.

The operation unit 24 includes operation buttons and accepts an operation instruction from a user. For example, the operation unit 24 accepts an instruction to turn off the power of the imaging device. In addition, the operation unit 24 accepts an instruction to record image data. Furthermore, the operation unit 24 accepts an instruction to switch to a standby mode. The standby mode is a mode for interrupting an operation while, for example, an operating state is being held. When accepting an operation instruction in the standby mode, the operation which is interrupted is restarted immediately.

Exemplary Functional Configuration of Imaging Device

Figure 2:
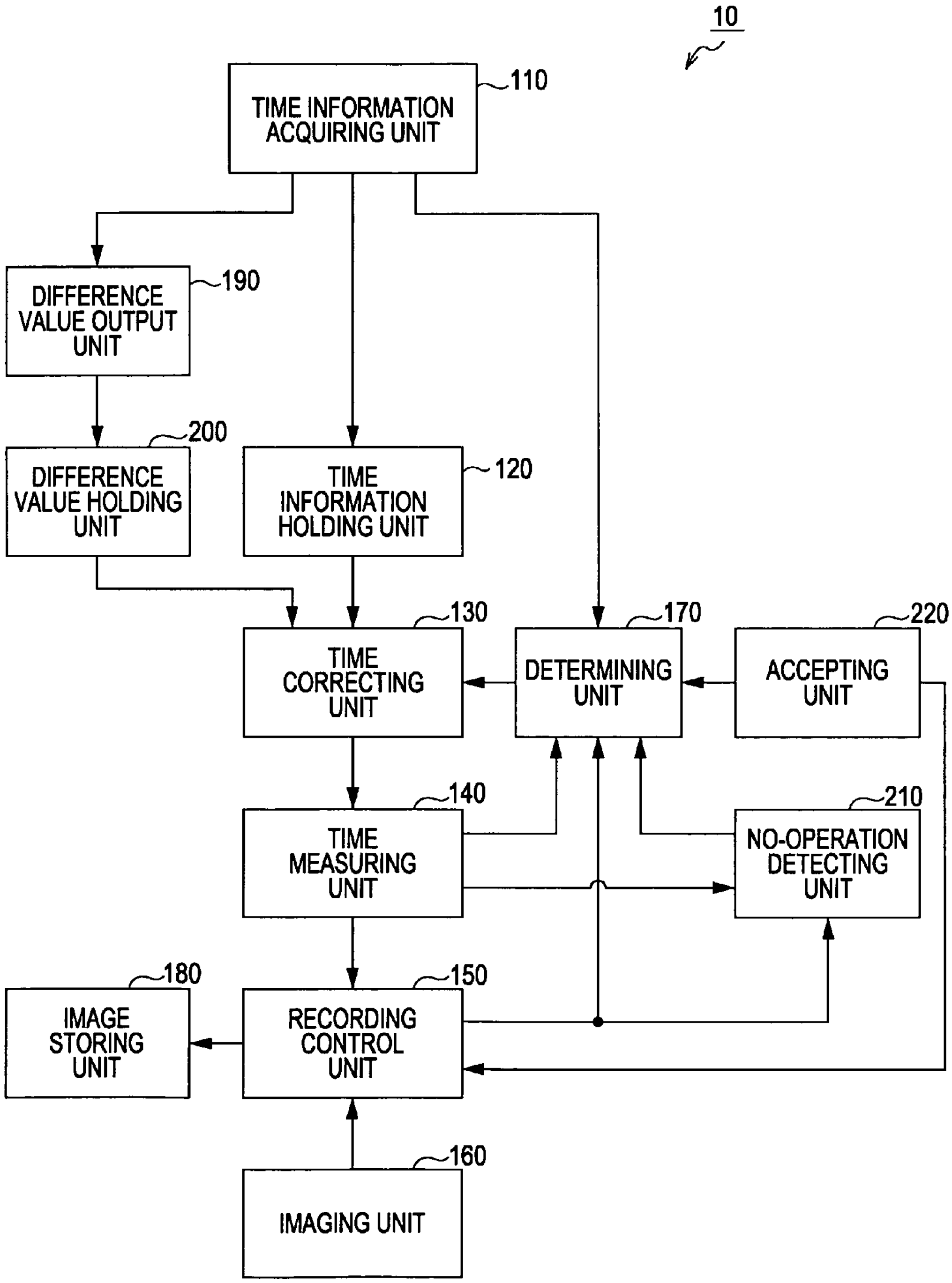
FIG. 2 is a block diagram illustrating an exemplary functional configuration of the imaging device in the first embodiment of the present invention.

FIG. 2 is a block diagram illustrating an exemplary functional configuration of the imaging device 10 according to the first embodiment of the present invention. The imaging device 10 includes a time information acquiring unit 110, a time correcting unit 130, a time measuring unit 140, a recording control unit 150, an imaging unit 160, a determining unit 170, a difference value output unit 190, a no-operation detecting unit 210, and an accepting unit 220. The imaging device 10 further includes a time information holding unit 120, an image storing unit 180, and a difference value holding unit 200.

The imaging unit 160 captures an image of a subject to generate image data. In addition, the imaging unit 160 outputs the generated image data to the recording control unit 150. The imaging unit 160 corresponds to the imaging unit 16 shown in FIG. 1.

The accepting unit 220 includes operation buttons and accepts an instruction to turn on or off the power of the imaging device 10. In addition, the accepting unit 220 accepts an instruction to switch the imaging device 10 to the standby mode. When accepting such an instruction, the accepting unit 220 outputs information indicating the acceptance to the determining unit 170. The accepting unit 220 corresponds to the operation unit 24 in FIG. 1.

The time information acquiring unit 110 acquires time information from a GPS signal and outputs the time information to the time information holding unit 120. When acquiring the time information, the time information acquiring unit 110 outputs information indicating the acquisition to the difference value output unit 190. The time information acquiring unit 110 corresponds to the GPS receiving unit 12 in FIG. 1. An operation of the time information acquiring unit 110 will be described later with reference to FIG. 3.

The time information holding unit 120 holds time information supplied from the time information acquiring unit 110. Every time the time information acquiring unit 110 outputs time information, the time information holding unit 120 rewrites the time information and holds the rewritten information. The time information holding unit 120 corresponds to the RAM 15 in FIG. 1.

When receiving information indicating the acquisition of time information from the time information acquiring unit 110, the difference value output unit 190 outputs a value, which corresponds to time elapsed from the time when the information was output, to the difference value holding unit 200. For example, the difference value output unit 190 outputs the value as a difference value every 1 ms to the difference value holding unit 200. The difference value output unit 190 corresponds to the control unit 11 in FIG. 1.

The difference value holding unit 200 holds a difference value output from the difference value output unit 190. Every time the difference value output unit 190 outputs a difference value, the difference value holding unit 200 rewrites the difference value and holds the rewritten value. The difference value holding unit 200 corresponds to the RAM 15 in FIG. 1.

The recording control unit 150 associates image data output from the imaging unit 160 with time measured by the time measuring unit 140 and allows the image storing unit 180 to store the associated data as a moving picture file. The recording control unit 150 corresponds to the image processing unit 18 in FIG. 1.

The image storing unit 180 stores a moving picture file output from the recording control unit 150. The image storing unit 180 corresponds to the HDD 17 in FIG. 1.

The no-operation detecting unit 210 gives an instruction to turn off the power of the imaging device 10 when a process based on a user operation is not performed for a predetermined period of time. The process based on a user operation is a process performed in response to the acceptance of a user operation input. Such a process is, for example, an image data recording process or a moving picture playback process. For instance, when the accepting unit 220 accepts a user operation input for inputting an instruction to record a captured moving picture, the image data recording process is performed in response to the operation input. The no-operation detecting unit 210 acquires time from the time measuring unit 140, for example, on completion of the image data recording process by the recording control unit 150. The no-operation detecting unit 210 successively acquires time from the time measuring unit 140 while the image data recording process by the recording control unit 150 is not performed. After the expiration of a predetermined period of time (e.g., five minutes) from the time when the time was first acquired, the no-operation detecting unit 210 gives an instruction to turn off the power of the imaging device 10. The no-operation detecting unit 210 corresponds to the control unit 11 in FIG. 1. The no-operation detecting unit 210 is an example of an instructing unit according to an embodiment of the present invention.

The determining unit 170 determines whether a specific process using time measured by the time measuring unit 140 is being performed. The specific process using time measured by the time measuring unit 140 is, for example, the image data recording process using the time as an object to be recorded or a no-operation detecting process using the time as reference time. The specific process is a process performed on the basis of time or a process using time during the process. In addition, after the no-operation detecting unit 210 gives an instruction to turn off the power of the imaging device 10, the determining unit 170 determines whether a specific process using time is being performed. Furthermore, on completion of the acceptance of an instruction to turn on or off the power of the imaging device 10 by the accepting unit 220, the determining unit 170 determines whether a specific process is being performed. The determining unit 170 corresponds to the control unit 11 in FIG. 1.

The time correcting unit 130 gives an instruction to correct time measured by the time measuring unit 140 when the determining unit 170 determines that a specific process is not being performed. Specifically, the time correcting unit 130 acquires time information held by the time information holding unit 120 and a difference value held by the difference value holding unit 200. The time correcting unit 130 corrects time measured by the time measuring unit 140 using a value, obtained by adding the difference value to time specified by the time information, as corrected time. The time correcting unit 130 corresponds to the control unit 11 in FIG. 1.

The time measuring unit 140 measures time. When the time correcting unit 130 gives an instruction to correct time, the time measuring unit 140 corrects time. The time measuring unit 140 corresponds to the time measuring unit 19 and the control unit 11 in FIG. 1.

Exemplary Acquisition of Time Information

Figure 3:
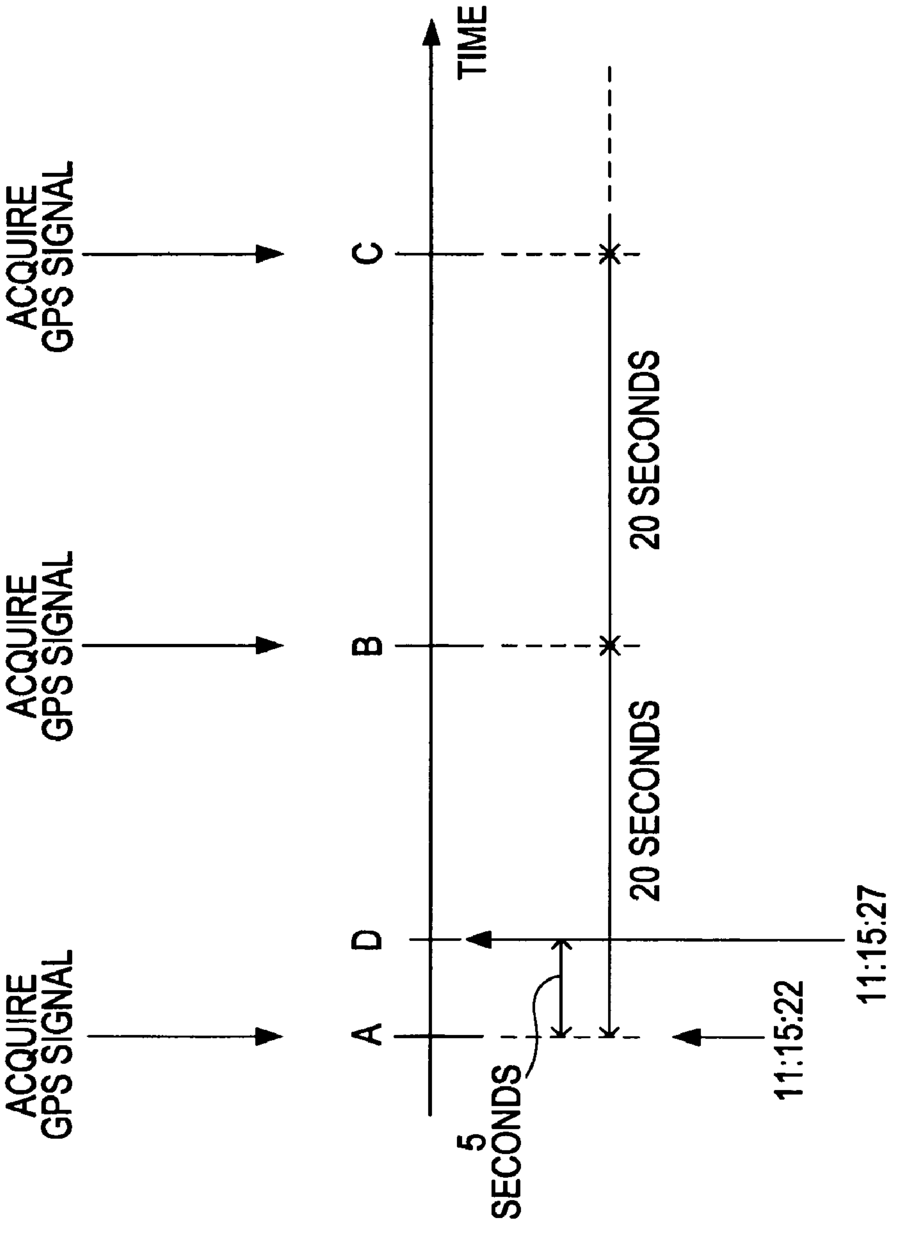
FIG. 3 is a diagram explaining a method of acquiring time information by a time information acquiring unit in the first embodiment of the present invention.

FIG. 3 is a diagram explaining a method of acquiring time information by the time information acquiring unit 110 in the first embodiment of the present invention. The abscissa of FIG. 3 represents the axis of time.

Referring to FIG. 3, the time information acquiring unit 110 receives a GPS signal at time intervals of, for example, 20 seconds. Every time the time information acquiring unit 110 receives a GPS signal, the unit 110 acquires time information included in the GPS signal and allows the time information holding unit 120 to hold the acquired time information. Specifically, the time information held by the time information holding unit 120 is rewritten every time the time information acquiring unit 110 acquires time information. When acquiring time information, the time information acquiring unit 110 outputs information indicating the acquisition to the difference value output unit 190. The difference value output unit 190 starts counting when the time information acquiring unit 110 outputs the information indicating the acquisition, and allows the difference value holding unit 200 to sequentially hold a difference value.

For example, it is assumed that time information acquired by the time information acquiring unit 110 and held by the time information holding unit 120 at time A is 11:15:22. In this case, time measured by the time measuring unit 140 is corrected using the time information "11:15:22" held by the time information holding unit 120 and a difference value counted by the difference value output unit 190 until the time information acquiring unit 110 acquires time information at time B.

For example, it is assumed that time after five seconds from time A is D. When the time correcting unit 130 gives an instruction to correct time measured by the time measuring unit 140 at time D, the time information "11:15:22" held by the time information holding unit 120 is added to a difference value "five seconds" held by the difference value holding unit 200, thereby calculating "11:15:27" as corrected time.

Exemplary Time Correction Process

Figure 4:
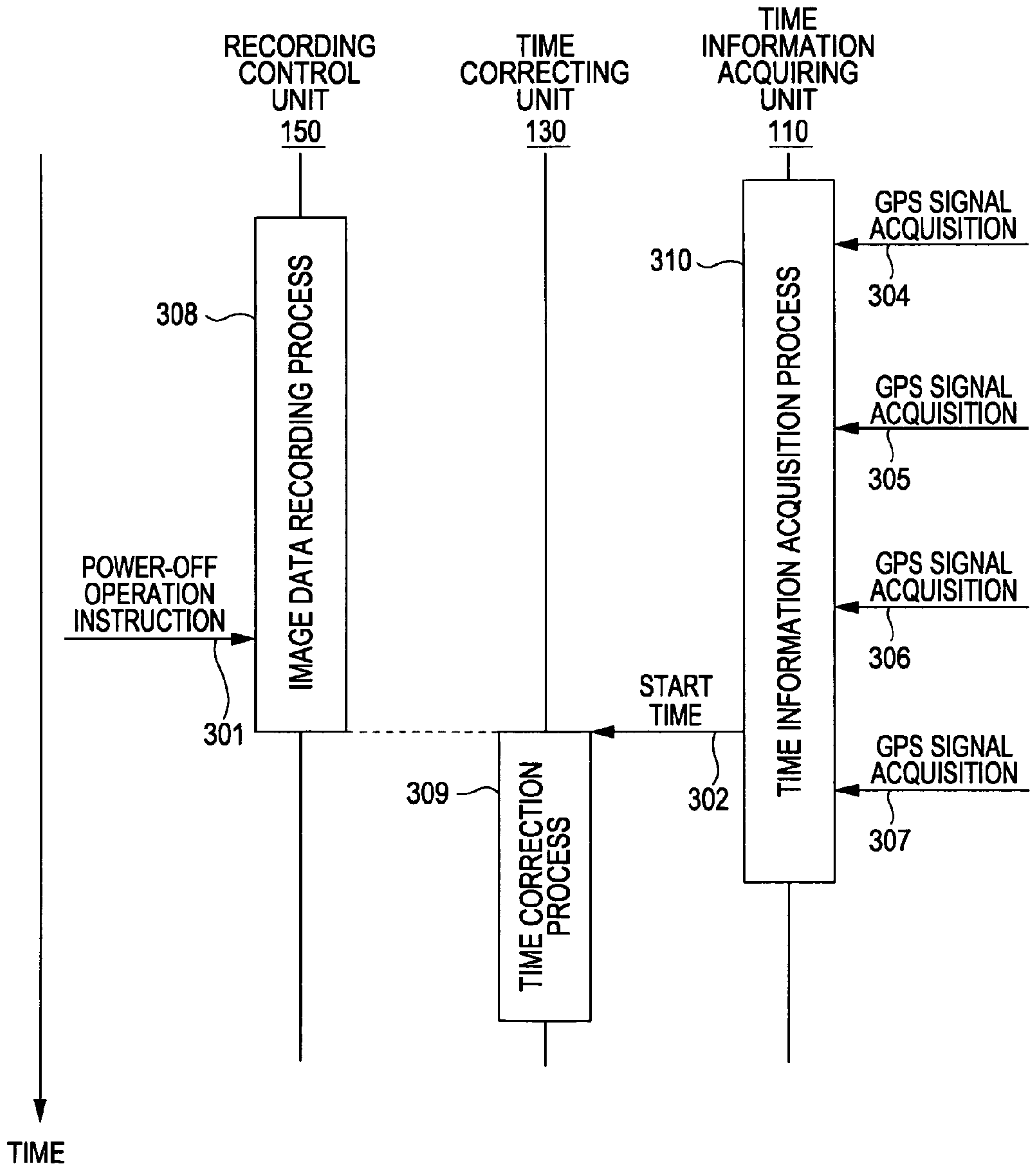
FIG. 4 is a first sequence diagram explaining a time correction process in the first embodiment of the present invention.

FIG. 4 is a first sequence diagram explaining a time correction process in the first embodiment of the present invention. FIG. 4 illustrates the relation between the image data recording process performed by the recording control unit 150 and the time correction process performed by the time correcting unit 130. The ordinate of FIG. 4 represents the axis of time.

The image data recording process, indicated at 308 in FIG. 4, is a process performed by the recording control unit 150 for associating image data output from the imaging unit 160 with time and storing the data as a moving picture file into the image storing unit 180. A time information acquisition process 310 is a process in which the time information acquiring unit 110 acquires time information and the difference value output unit 190 outputs a difference value on the basis of the time information. According to the time information acquisition process 310, as shown in FIG. 4, time information is acquired by GPS signal acquisitions 304 to 307 at predetermined intervals (of, for example, 20 seconds).

The time correction process, indicated at 309, performed when a power-off operation instruction 301 shown in FIG. 4 is given during the image data recording process 308 will be described below.

First, the power-off operation instruction 301 is accepted by the accepting unit 220. After the accepting unit 220 accepts the power-off operation instruction 301, the determining unit 170 determines whether a specific process using time measured by the time measuring unit 140 is being performed. In this case, the recording control unit 150 performs the image data recording process 308. Accordingly, this means that the specific process using time measured by the time measuring unit 140 is being performed. The determining unit 170 therefore repeats the determination until the image data recording process 308 is completed. On completion of the image data recording process 308, the determining unit 170 determines that the specific process using time measured by the time measuring unit 140 is not being performed. In response to the determination, the time correcting unit 130 starts the time correction process 309.

At the start of the time correction process 309, the time correcting unit 130 acquires a difference value held by the difference value holding unit 200 and time information held by the time information holding unit 120. The time correcting unit 130 adds the difference value to time specified by the time information to calculate corrected time and corrects time measured by the time measuring unit 140 on the basis of the corrected time.

In this instance, the time information held by the time information holding unit 120 is time information acquired at timing of the GPS signal acquisition 306 shown in FIG. 4. The difference value held by the difference value holding unit 200 is a value corresponding to time between the timing of the GPS signal acquisition 306 and start time 302 when the time correction process 309 is started.

Figure 5:
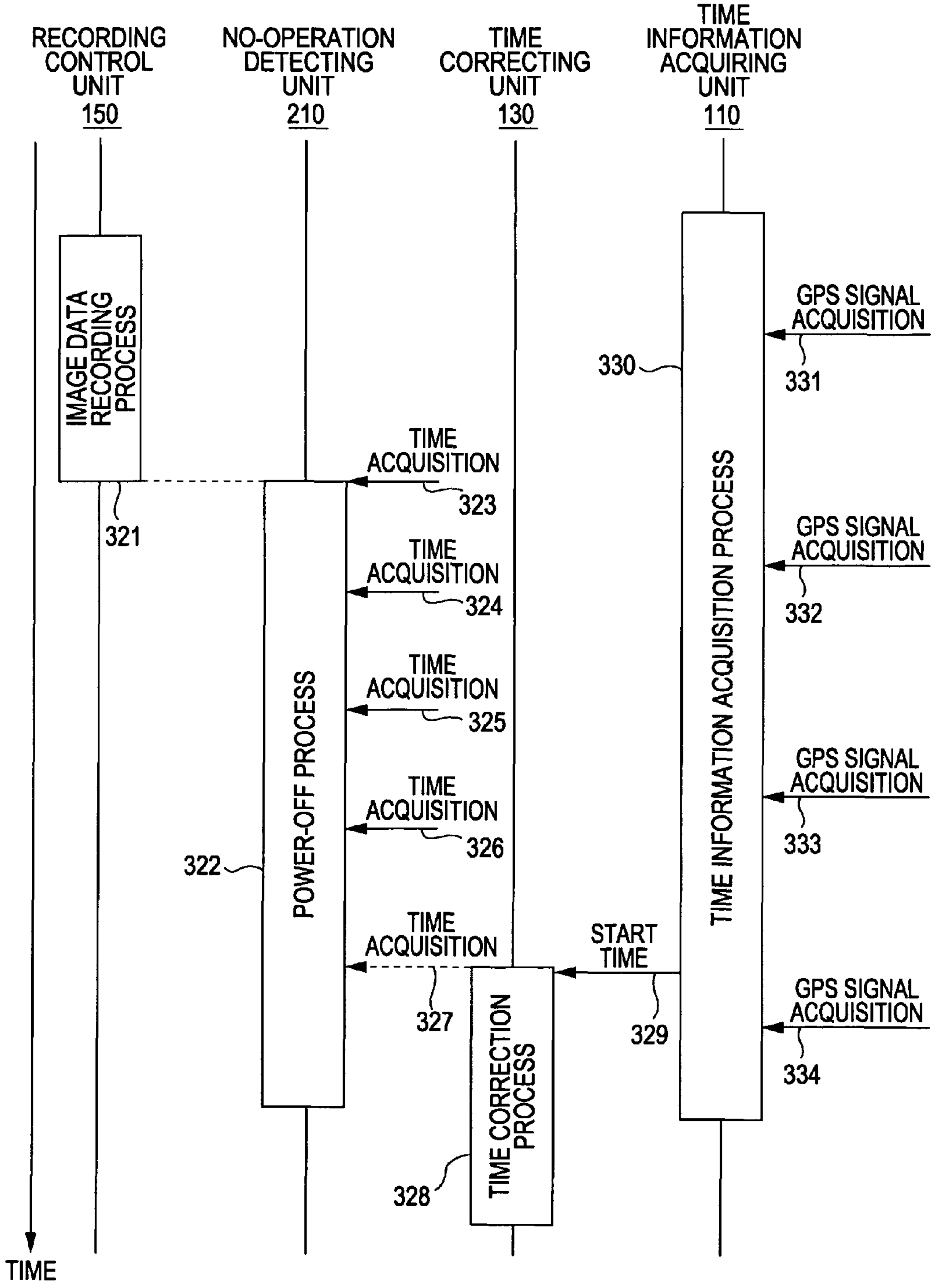
FIG. 5 is a second sequence diagram explaining a time correction process in the first embodiment of the present invention.

FIG. 5 is a second sequence diagram explaining a time correction process in the first embodiment of the present invention. FIG. 5 illustrates the relation among the image data recording process performed by the recording control unit 150, a power-off process performed by the no-operation detecting unit 210, and the time correction process performed by the time correcting unit 130. The ordinate of FIG. 5 represents the axis of time.

The power-off process, indicated at 322, in FIG. 5 is a process in which the no-operation detecting unit 210 instructs the imaging device 10 to be turned off when a process based on a user operation is not performed for a predetermined period of time.

For example, as shown in FIG. 5, the no-operation detecting unit 210 acquires time from the time measuring unit 140 on completion of the image data recording process, indicated at 321, performed by the recording control unit 150, i.e., at the timing of time acquisition 323. The no-operation detecting unit 210 successively acquires time from the time measuring unit 140 as shown by time acquisitions 324 to 326 in FIG. 5. If a process (image data recording process in FIG. 5) based on a user operation is not performed for a predetermined period of time between the time acquisition 323 and the time acquisition 327, for example, at time acquisition 327 shown in FIG. 5, the no-operation detecting unit 210 gives an instruction to turn off the power of the imaging device 10. When the no-operation detecting unit 210 gives an instruction to turn off the power of the imaging device 10, the determining unit 170 determines whether a specific process based on time measured by the time measuring unit 140 is being performed. For example, if the image data recording process 321 is not performed and a specific process based on time measured by the time measuring unit 140 is not performed as shown in FIG. 5, the determining unit 170 determines that the specific process is not being performed. In response to the determination that the specific process is not being performed by the determining unit 170, the time correcting unit 130 starts the time correction process indicated at 328.

At the start of the time correction process 328, the time correcting unit 130 acquires a difference value held by the difference value holding unit 200 and time information held by the time information holding unit 120. The time correcting unit 130 adds the difference value to time specified by the time information to calculate corrected time and corrects time measured by the time measuring unit 140 on the basis of the corrected time.

In this instance, the time information held by the time information holding unit 120 is time information acquired at the timing of GPS signal acquisition 333 shown in FIG. 5. The difference value held by the difference value holding unit 200 is a value corresponding to time between the timing of the GPS signal acquisition 333 and start time 329 when the time correction process 328 is started.

Exemplary Display of Notification about Time Correction

Figure 6:
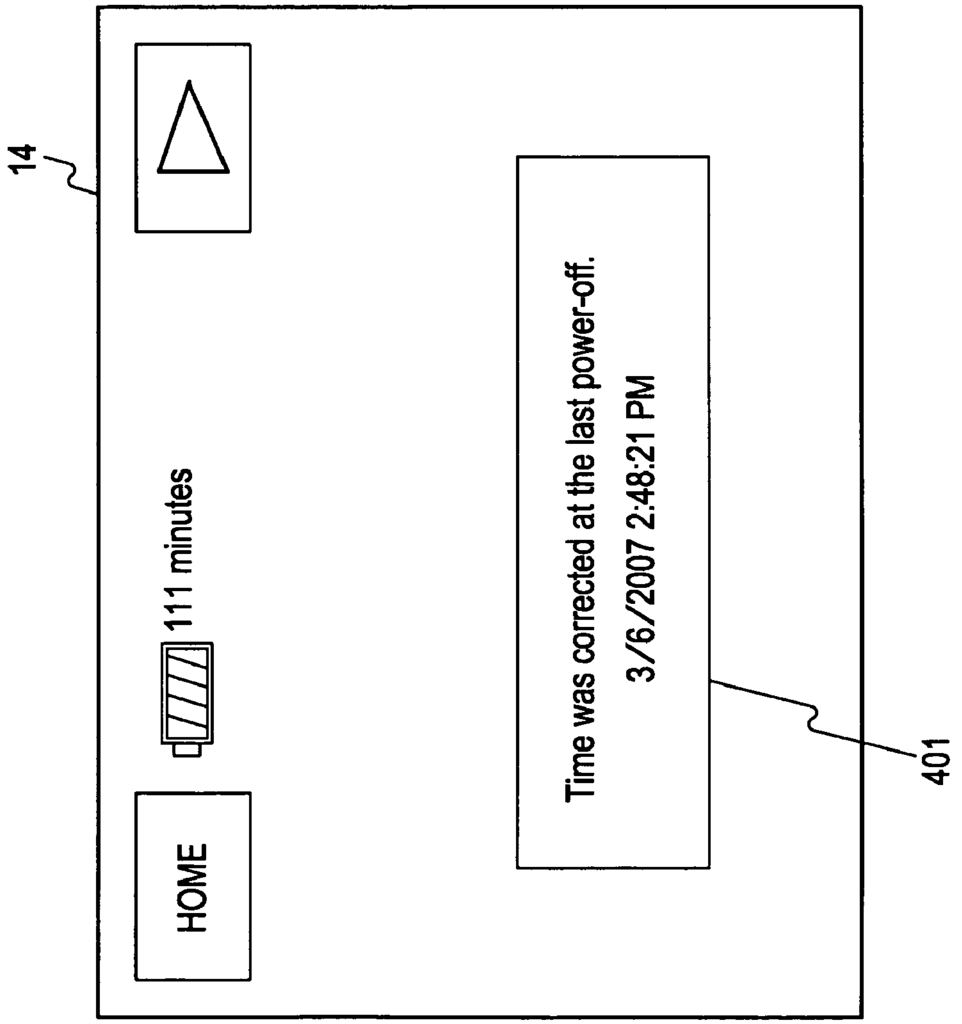
FIG. 6 is a diagram illustrating an example of a notification about time correction displayed on a display unit in the first embodiment of the present invention.

FIG. 6 is a diagram illustrating an exemplary notification about time correction displayed on the display unit 14 in the first embodiment of the present invention.

Referring to FIG. 6, corrected time is displayed on a screen of the display unit 14 to notify the user of a fact that time has been corrected. For example, when an instruction to turn off the power of the imaging device 10 is given, time measured by the time measuring unit 140 is corrected and the power of the imaging device 10 is turned off. Just after correction, for example, information indicating that time has been corrected is stored into the HDD 17. When the power of the imaging device 10 is turned on, the display unit 14 is allowed to display a time correction notification window 401 shown in FIG. 6, thus notifying the user of the fact that time has been corrected. The time correction notification window 401 may be automatically closed, for example, after five seconds from the start of display. Alternatively, the window may be closed in response to a closing operation performed by the user. When the time correction notification window 401 is closed, for example, the information, indicating that time has been corrected, stored in the HDD 17 is deleted. In the first embodiment of the present invention, a notification indicating that time has been corrected is displayed upon power-on after the last power-off. The notification may be displayed just after time is corrected upon power-off. In the first embodiment of the present invention, a notification is made by displaying a message indicating that time has been corrected. For example, the notification may be made using speech output.

Exemplary Operation of Imaging Device

An exemplary operation of the imaging device 10 according to the first embodiment of the present invention will be described below.

Figure 7:
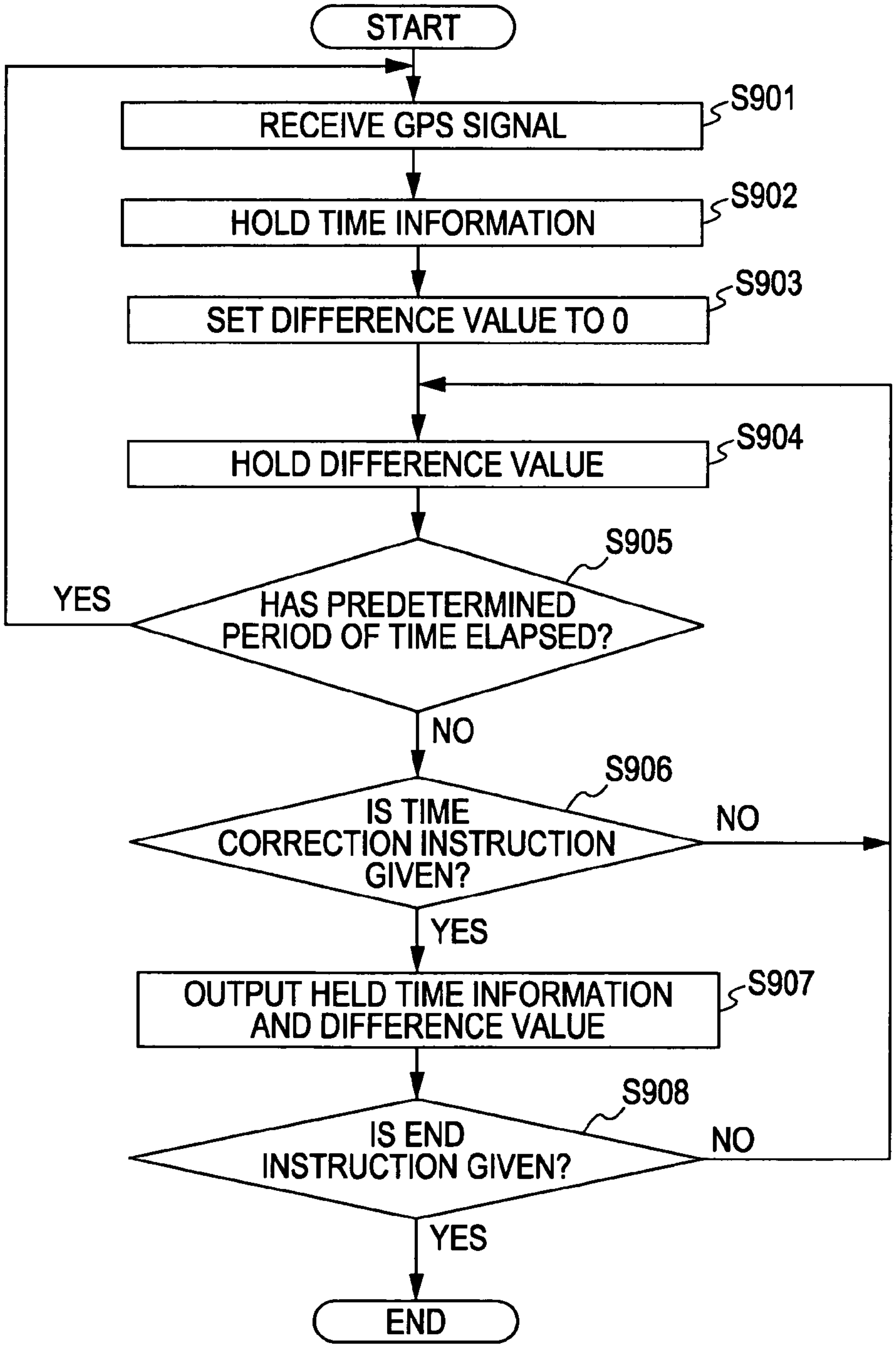
FIG. 7 is a flowchart illustrating processing steps of a corrected time acquisition process by the imaging device in the first embodiment of the present invention.

FIG. 7 is a flowchart illustrating processing steps of a corrected time acquisition process by the imaging device in accordance with the first embodiment of the present invention.

First, the time information acquiring unit 110 acquires time information (step S901). Step S901 is an exemplary step of acquiring time information according to an embodiment of the present invention. The time information holding unit 120 holds the time information (step S902). Subsequently, the difference value output unit 190 sets a difference value to "0" and starts counting (step S903). The difference value holding unit 200 holds the difference value counted by the difference value output unit 190 (step S904). If a predetermined period of time has elapsed after the start of counting (YES in step S905), the process is returned to step S901, in which a GPS signal is received. Whereas, if a predetermined period of time has not elapsed after the start of counting (NO in step S905), whether a time correction instruction is given by the time correcting unit 130 is determined (step S906).

If the time correction instruction is not given (NO in step S906), the process is returned to step S904 in which the difference value holding unit 200 holds a difference value counted by the difference value output unit 190. Whereas, if the time correction instruction is given (YES in step S906), the time correcting unit 130 acquires the difference value held by the difference value holding unit 200 and the time information held by the time information holding unit 120 (step S907). Subsequently, if an end instruction is given (YES in step 908), the corrected time acquisition process terminates. Whereas, if the end instruction is not given (NO in step S908), the process is returned to step S904 in which the difference value holding unit 200 holds the difference value counted by the difference value output unit 190.

Figure 8:
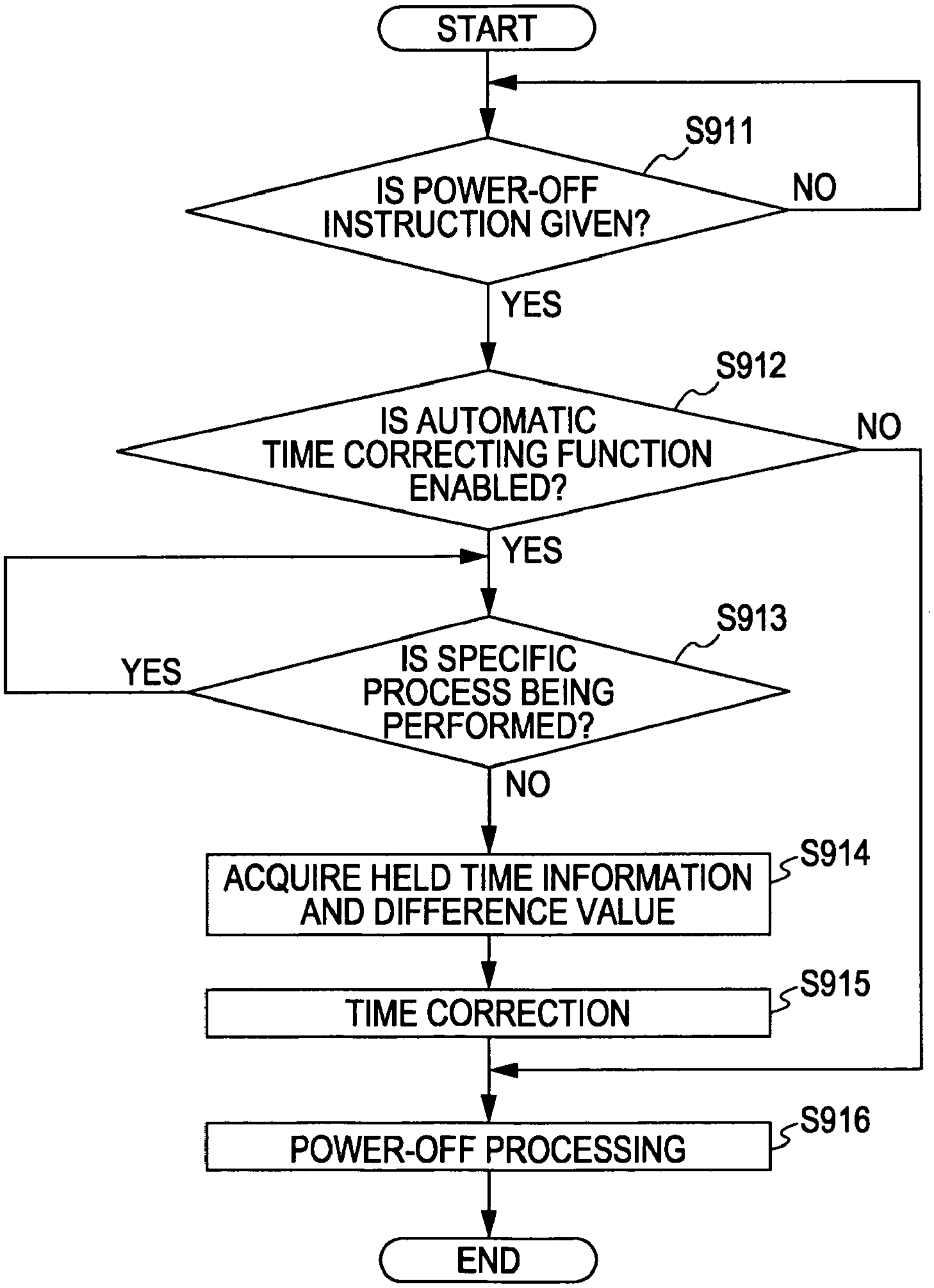
FIG. 8 is a flowchart illustrating processing steps of a time correction process by the imaging device in the first embodiment of the present invention.

FIG. 8 is a flowchart illustrating processing steps of a time correction process by the imaging device 10 according to the first embodiment of the present invention. FIG. 8 illustrates a case where whether a specific process is being performed is determined in response to a power-off instruction given by a user operation.

First, whether a power-off instruction is given to the accepting unit 220 is determined (step S911). The determination is repeated until the power-off instruction is given (NO in step S911). If the power-off instruction is given (YES in step S911), whether an automatic time correcting function is enabled is determined (step S912). In this instance, the automatic time correcting function is a function of automatically performing the time correction process. The automatic time correcting function can be set to be enabled or disenabled in accordance with a user operation. If the automatic time correcting function is disenabled (NO in step S912), power-off processing for the imaging device 10 is performed (step S916), so that the corrected time acquisition process terminates. Whereas, if the automatic time correcting function is enabled (YES in step S912), whether a specific process is being performed is determined (step S913). If the specific process is being performed (YES in step S913), the determination is repeated (YES in step S913) until the specific process terminates (NO in step S913). Step S913 is an exemplary step of determining according to the embodiment of the present invention. Subsequently, the time correcting unit 130 acquires a difference value held by the difference value holding unit 200 and time information held by the time information holding unit 120 (step S914). The time correcting unit 130 corrects time measured by the time measuring unit 140 on the basis of a value, obtained by adding the difference value to time specified by the time information, as a corrected time (step S915). Step S915 is an exemplary step of correcting time according to the embodiment of the present invention. The power-off processing for the imaging device 10 is performed (step S916). The corrected time acquisition process terminates.

2. Modification

A modification of the first embodiment of the present invention will now be described.

An imaging device 30 according to the modification of the first embodiment of the present invention includes a wireless local area network (LAN) transmitter/receiver instead of the GPS receiving unit 12 in the first embodiment. The configuration of the imaging device 30 is the same as that of the imaging device 10 shown in FIG. 1, except for providing the wireless LAN transmitter/receiver. Accordingly, components common to the imaging device 30 and the imaging device 10 shown in FIG. 1 will be omitted and the difference therebetween will be mainly described below.

The wireless LAN transmitter/receiver is connected to access points located in the vicinity thereof and transmits and receives data using a radio communication method. The wireless LAN transmitter/receiver accesses a network time protocol (NTP) server through any access point to acquire time information (UTC time information) held by the NTP server. The wireless LAN transmitter/receiver outputs the acquired time information to the control unit 11.

Figure 9:
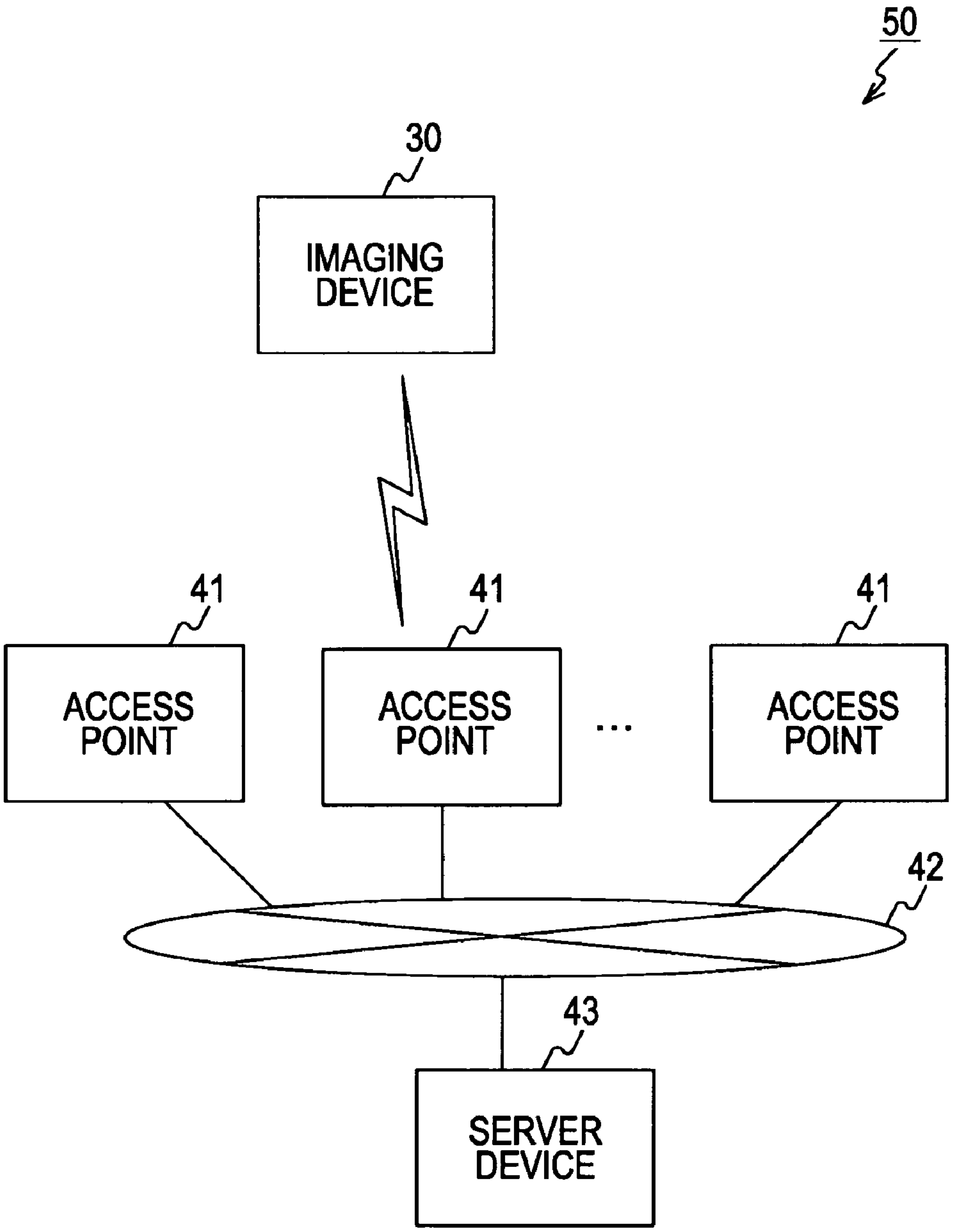
FIG. 9 is a diagram illustrating a communication system in accordance with a modification of the first embodiment of the present invention.

FIG. 9 is a diagram illustrating a communication system 50 in accordance with the modification of the first embodiment of the present invention.

Referring to FIG. 9, the communication system 50 includes the imaging device 30, the access points, indicated at 41, a communication network 42, and a server device 43.

The access points 41 are connected to the communication network 42. Data is transmitted and received between the imaging device 30 and the server device 43 through the access points 41. The access points 41 transmit time information output from the server device 43 to the imaging device 30 in response to a request from the imaging device 30.

The server device 43 is an NTP server connected to the communication network 42 and holds time information. The server device 43 transmits the held time information to the imaging device 30 via any access point 41 in response to a request from the imaging device 30.

The imaging device 30 can correct time using the time information acquired in that manner.

As described above, according to the first embodiment of the present invention, time is corrected when a specific process using time measured by the time measuring unit is not being performed. Accordingly, for example, when a moving picture is being recorded while time is associated with each frame, time is not corrected. Consequently, time recorded in the same moving picture can be prevented from being remarkably changed due to time correction. In addition, the content of a specific process using time which is being performed can be prevented from being changed due to time correction. In the first embodiment of the present invention, whether a specific process is being performed is determined at the time when a power-on instruction for the imaging device 10 is given and, after that, time is corrected. Accordingly, time correction can be performed at appropriate time.

In the above-described embodiment of the present invention, the imaging device has been described. The embodiment of the present invention can also be applied to, for example, an electronic apparatus including the time measuring unit for measuring time and the time information acquiring unit for acquiring time information. In addition to the method of acquiring time information using a GPS signal or a wireless LAN, time information may be acquired using another time information acquiring method. In the first embodiment of the present invention, the recording control process has been described as an example of a specific process using time. For example, the embodiment of the present invention may be similarly applied to a setting time notification process of notifying a user of setting time using time. Furthermore, whether a specific process is being performed may be determined at the time when a power-off instruction for the imaging device is given, alternatively, when the mode is switched to the standby mode or a power saving mode and, after that, time may be corrected.

The embodiment of the present invention is an example for embodying the present invention. As described above, there is the correspondence between the features of the claims and the specific elements in the embodiment of the present invention. It should be understood by those skilled in the art that the present invention is not limited to the embodiment and various modifications may be made without departing from the spirit and scope of the present invention.

Processing steps described in the foregoing embodiment of the present invention may be regarded as a method including those processing steps, a program that allows a computer to execute those processing steps, or a recording medium that stores the program. As for the recording medium, for example, a compact disc (CD), a MiniDisc (MD), a digital versatile disk (DVD), a memory card, a Blu-ray Disc (Registered Trademark), or the like is available.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:

a time measuring unit that measures time;

a time information acquiring unit that acquires time information;

a determining unit that determines whether a specific process using the measured time is being performed; and a time correcting unit that corrects time measured by the time measuring unit based on the acquired time information when the determining unit determines that the specific process is not being performed, wherein the time information acquiring unit acquires the time information at regular intervals, and the time correcting unit corrects the measured time based on a most recently acquired time information and a difference value corresponding to time elapsed from the time that the most recently acquired time information was acquired.

2. The apparatus according to claim 1, wherein the determining unit determines whether a process of acquiring the time information by the time information acquiring unit is being performed as the specific process.

3. The apparatus according to claim 1, further comprising:

an accepting unit that accepts an instruction to turn on or off the power of the electronic apparatus, wherein after the instruction is accepted, the determining unit determines whether the specific process is being performed.

4. The apparatus according to claim 1, further comprising:

an instructing unit that gives an instruction to turn off the power of the electronic apparatus when a process based on a user operation is not performed for a predetermined period of time, wherein after the instruction is accepted, the determining unit determines whether the specific process is being performed.

5. The apparatus according to claim 1, further comprising:

a display unit that, after the time correcting unit corrects the time, displays information indicating the correction.

6. The apparatus according to claim 1, wherein the time information acquiring unit acquires the time information from a GPS signal.

7. An imaging device, comprising:

an imaging unit that captures an image of a subject to generate image data;

a time measuring unit that measures time;

a recording control unit that records the generated image data in association with the measured time;

a time information acquiring unit that acquires time information;

a determining unit that determines whether the image data is being recorded by the recording control unit; and a time correcting unit that corrects the measured time based on the acquired time information when the determining unit determines that the image data is not being recorded, wherein the time information acquiring unit acquires the time information at regular intervals, and the time correcting unit corrects the measured time based on a most recently acquired time information and a difference value corresponding to time elapsed from the time that the most recently acquired time information was acquired.

8. The imaging device according to claim 7, wherein the time information acquiring unit acquires the time information from a GPS signal.

9. A method for time correction, the method comprising:

acquiring time information;

determining whether a specific process using a measured time is being performed; and correcting the measured time based on the time information when it is determined that the specific process is not being performed, wherein the time information is acquired at regular intervals, and the measured time is corrected based on a most recently acquired time information and a difference value corresponding to time elapsed from the time that the most recently acquired time information was acquired.

10. The method according to claim 9, wherein the acquired time information is acquired from a GPS signal.

11. A processor encoded with a computer program for performing a method of time correction, the method comprising:

acquiring time information;

determining whether a specific process using a measured time is being performed; and correcting the measured time based on the time information when it is determined that the specific process is not being performed, wherein the time information is acquired at regular intervals, and the measured time is corrected based on a most recently acquired time information and a difference value corresponding to time elapsed from the time that the most recently acquired time information was acquired.

12. The processor according to claim 11, wherein the acquired time information is acquired from a GPS signal.

* * * * *